United States Patent [19]
Tominaga

[11] Patent Number: 4,858,715
[45] Date of Patent: Aug. 22, 1989

[54] THROTTLE CONTROL DEVICE

[75] Inventor: Tsutomu Tominaga, Hyogo, Japan

[73] Assignee: Mitsubishi Denki Kabushiki Kaisha, Tokyo, Japan

[21] Appl. No.: 172,093

[22] Filed: Mar. 23, 1988

[30] Foreign Application Priority Data

Mar. 27, 1987 [JP] Japan .................. 62-46356[U]

[51] Int. Cl.$^4$ .................. B60K 31/00; F02D 11/04
[52] U.S. Cl. .................. 180/170; 180/197; 123/352
[58] Field of Search .................. 180/197, 170, 178; 123/332, 333, 336, 337, 376, 350, 352, 398, 400; 74/469, 513

[56]  References Cited
U.S. PATENT DOCUMENTS 3,776,355 12/1973 Scherenberg .................. 180/197

FOREIGN PATENT DOCUMENTS 143142  8/1983 Japan .................. 180/170
  4427  1/1985 Japan .................. 123/352
2125142  2/1984 United Kingdom .................. 180/170
2146384  4/1985 United Kingdom .................. 180/170

Primary Examiner—Charles A. Marmor
Attorney, Agent, or Firm—Sughrue, Mion, Zinn, Macpeak and Seas

[57]  ABSTRACT

A throttle control device includes an acceleration system, a throttle system, a constant speed running or "cruise control" system, and a traction slippage control system, all of which are ganged together by wires and abutting movable elements such that they are interrelatedly controlled as a whole.

7 Claims, 1 Drawing Sheet

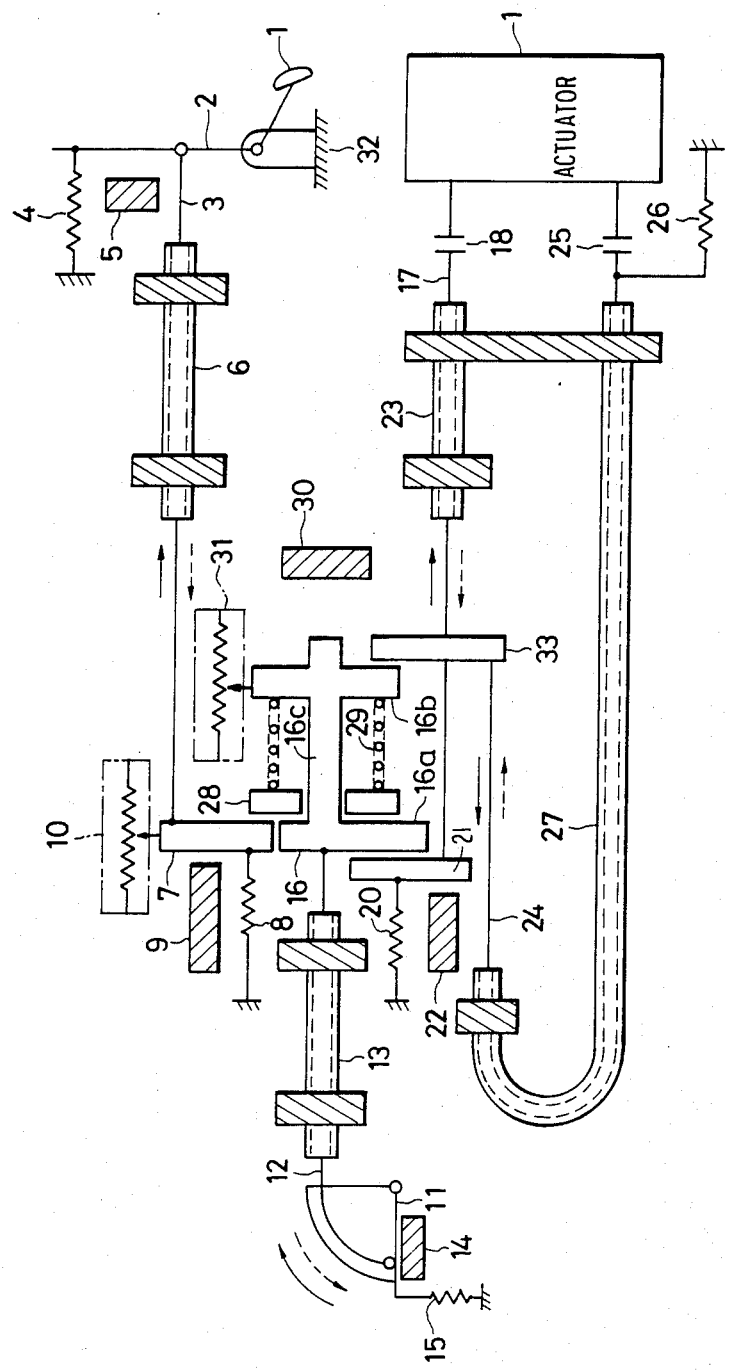

THROTTLE CONTROL DEVICE

BACKGROUND OF THE INVENTION

The present invention relates to a throttle control device and, particularly, to a control device having an accelerator operating system, a throttle operating system, a constant speed running control system and a traction control system.

Traction control for starting of an automobile has been performed by either (a) decreasing the depression of an acceleration pedal when a tire slip occurs, (b) performing slip control by means of an anti-skid brake control, or (c) decreasing a throttle opening by means of a constant speed running device, and the throttle control and the slip limiting control by a brake have been performed separately.

SUMMARY OF THE INVENTION

An object of the present invention is to provide a throttle control device which is ganged with a slip limiting control to form a total traction control system.

The throttle control device according to this invention is constituted by an acceleration system, a constant speed running system, and a traction control system whose movable elements are connected to each other by wires so that the respective movable elements are ganged together.

In the present invention, the movable member of the acceleration system is moved correspondingly to the amount of depression of the acceleration pedal of the system through an acceleration wire, and the movable member of the throttle system is also moved through the throttle wire to open a throttle valve during a usual running control. Under a constant speed running control, an actuator moves the movable member of the constant running system through a constant speed wire and the movable member of the throttle system through the throttle wire, to control the opening of the throttle valve. On the other hand, under traction control, when a tire slip occurs due to an abrupt depression of the accelerator pedal, it is detected by a slip detector upon which a traction clutch is turned on to move the movable element thereof through the traction wire to thereby control the throttle valve opening through the movable element of the throttle such that the valve opening is reduced.

BRIEF DESCRIPTION OF THE DRAWING

The single FIGURE shows a construction of an embodiment of a throttle control device according to the present invention.

DETAILED DESCRIPTION OF THE PREFERRED EMBODIMENT

In the single Figure which shows a construction of an embodiment of the throttle control device according to the present invention, an acceleration pedal 1 is linked to an acceleration link 2 to which an end of an acceleration wire 3 is connected. An end of a pedal return spring 4 is connected to the acceleration link 2 to bias it in a return direction so that it is normally in an initial, idle position defined by a stopper 5. The acceleration wire 3 is disposed in an acceleration wire guide 6 movably therethrough and has one end connected to an acceleration movable element 7 which is biased in a return direction by a return spring 8 so that it is normally in an initial position defined by a stopper 9. A reference numeral 10 depicts an acceleration sensor provided on the movable element 7. A throttle link 11 is connected to a throttle valve (not shown) and has a movable portion to which one end of a throttle wire 12 is connected. The other end of the throttle wire 12 is connected to one end of a movable element 16. The throttle wire 12 is movable in a throttle wire guide 13. A reference numeral 30 depicts a stopper for restricting a maximum stroke position of the movable element 16. The throttle valve is biased in a closing direction by a throttle return spring 15 connected to the movable portion of the throttle link 11 so that it is in an initial position defined by a throttle link stopper 14. A reference numeral 28 depicts an intermediate disc which is provided coaxially with a shaft portion 16c of the movable element 16 in contact with a front end flange 16a thereof. An intermediate spring 29 is provided between the intermediate disc 28 and a rear flange 16b of the movable element 16. The intermediate spring 29 has a spring constant which is at least 1.5 times that of the throttle return spring 15.

A reference numeral 31 is a throttle sensor provided on the rear flange 16b of the movable element 16. A wire 17 for constant speed running has one end connected to a constant speed clutch 18 connected (cruise control) to an actuator 19 and the other end connected to a movable element 21 for constant speed to which a return spring 20 is connected to bias it in a resetting direction so that it is normally in an initial position defined by a stopper 22. The wire 17 is movable in a wire guide 23.

A traction wire 24 has one end connected to a traction clutch 25 connected to the actuator 19 and the other end connected to a movable element 33 for traction control. The wire 24 is connected to one end of a traction spring 26 and biased thereby to a traction side. The traction wire 24 is guided in a traction wire guide 27.

An operation of the throttle control device constructed as above will be described.

(I) Normal Running Control

When the acceleration pedal 1 is depressed during a normal running condition, a torque is transmitted through the acceleration link 2 connected thereto to the acceleration wire 3, so that the latter is pulled in a direction shown by a solid arrow. When the depressing force applied to the pedal 1 is larger than the spring force of the return spring 8, the movable element 7 is shifted rightwardly together with the acceleration wire 3 so that a compression force is applied to the intermediate spring 29 through the intermediate disc 28. However, since the intermediate spring 29 is not compressed due to its high spring constant, and movable element 16 is shifted rightwardly, and the throttle wire 12 is pulled rightwardly to drive the throttle valve in an opening direction through the throttle link 11. As a result, an automobile speed is controlled correspondingly to the opening of the throttle.

(II) Constant Speed Running Control

Under a constant speed running condition, the clutch 18 is energized and the wire 17 is pulled in a solid arrow direction by the actuator 19 corresponding to a deviation of the vehicle speed from a set value. Therefore, the movable element 21 is shifted rightwardly and the throttle movable element 16 is also shifted rightwardly. As a result, the throttle wire 12 is pulled rightwardly to drive the throttle valve in the opening direction through the throttle link 11, and, when the speed deviation becomes zero, the opening of the throttle valve at this time is maintained to set the constant speed running condition.

Assuming that outputs of the acceleration sensor 10 and the throttle sensor 31 are depicted by S1 and S2, respectively, the following conditions are established, where S0 is an aimed throttle opening, S0' is a controlled throttle opening and ΔS is a width of control.

| | | |
|---|---|---|
| At a start of constant speed running | S2 = S0 | (1) |
| During constant speed running control | S2' = S0 ± ΔS | (2) |
| At an end of constant speed running | S2" = S0' ≃ S0 | (3) |

(III) Traction Control

Under a start condition of an automobile having a manual shift, a tire slip occurring due to an abrupt depression of the accelerator pedal 1 is detected by a slip detector provided on a brake system in response to which the traction clutch 25 is energized and the traction wire 24 is pulled in a direction shown by the solid arrow until the slip detection signal disappears regardless of the amount of depression of the acceleration pedal 1. Therefore, the movable element 33 is shifted leftwardly to control the throttle to reduce its opening defined by the depressed pedal 1 through the movable element 16 and, when the opening reaches an initial throttle opening, the traction control is terminated.

Assuming that outputs of the acceleration sensor 10 and the throttle sensor 31 are depicted by S1 and S2, respectively, the following conditions are established.

| | | |
|---|---|---|
| At a start of traction control | S1 = S2 = S0 | (4) |
| During a traction control | S2' = S0 − ΔS | (5) |
| At an end of traction control | S2"= S0' = S0 | (6) | where S0 is an initial opening, S0' is a controlled opening and ΔS is a width of control.

When the acceleration pedal 1 is depressed continuously during the traction control, the intermediate spring 29 is compressed and the reactive force thereof is transmitted to the acceleration pedal 1. Therefore, the pedal feels heavy to an operator and he removes his foot to close the throttle valve.

(IV) Initial Condition

Under a control-free condition where none of the controls (I), (II), (III) and (IV) is performed or a power switch is turned off, the throttle valve is kept at closed condition or at minimum opening condition. Therefore, there is no such condition provided as an abrupt starting of the automobile.

As described hereinbefore, according to the present invention which is a throttle control device, either one of the normal running control, the constant speed running control and the traction control can be performed and under the initial condition the throttle valve is kept closed or substantially closed. Therefore, there is no uncontrolled starting of the automobile, resulting in an essentially safe automobile. Further, since all of the driving of the device is performed by wires, the device itself can be made compact, providing a high freedom of arrangement thereof. In addition, since the acceleration opening ( or a shift amount of the acceleration wire ) and the throttle opening ( or a shift amount of the throttle wire ) are detected by the acceleration sensor and the throttle sensor, respectively, and the throttle opening control is performed according thereto, the control itself becomes highly accurate.

What is claimed is:

1. A throttle control device, comprising: an acceleration pedal (1), an acceleration wire (3) connected at one end, through an acceleration link (2), to said acceleration pedal, an acceleration return spring (4) operatively connected to said acceleration pedal for biasing said acceleration pedal towards an initial, idle position thereof, an acceleration movable element (7) connected to another end of said acceleration wire, an acceleration movable element return spring (8) operatively connected to said acceleration movable element for biasing said acceleration movable element in a direction towards an initial position thereof, an acceleration sensor (10) provided on said acceleration movable element, a throttle movable element (16), a throttle wire (12) connected at one end to said throttle movable element and connected at another end, through a throttle link (11), a to a throttle valve, a throttle movable element return spring (15) operatively connected to said throttle link for biasing said throttle valve towards a closed state, a constant speed running clutch (18) coupled to an actuator (19), a constant speed running wire (17) connected between said clutch and a constant speed running movable element (21), a constant speed running return spring (20) operatively connected to said constant speed running movable element for biasing said constant speed running movable element towards an initial position, a traction wire (24) connected between a traction clutch (25) coupled to said actuator and a traction movable element (33), a traction return spring (26) operatively connected to said traction wire for biasing said traction wire in a direction toward said traction clutch, a throttle sensor (31) provided on said throttle movable element, an intermediate disc member (28) provided between opposite flanges (16a, 16b) of said throttle movable element, and an intermediate spring (29) provided between said intermediate disc member and a rear one of said flanges of said throttle movable element, said acceleration movable element (7) being disposed to operatively engage said throttle movable element (16) via said disc member (28) and said intermediate spring (29), and said constant speed running movable element (21) and said traction movable element (33) being disposed to operatively engage said throttle movable element directly.

2. The throttle control device as claimed in claim 1, wherein said acceleration movable element (7) is pulled by said acceleration wire (3) when said acceleration pedal is depressed to transmit a torque through said intermediate spring to said rear flange of said throttle movable element (16) to thereby open said throttle valve through said throttle wire (12) and said throttle link (11).

3. The throttle control device as claimed in claim 1, wherein said constant speed running movable element (21) is pulled by said constant speed running wire (17) through said actuator (19) and said constant speed running clutch (18) and transmits a torque to a front one (16a) of said flanges of said throttle movable element during a constant speed running mode to control the opening of said throttle valve to a predetermined value through said throttle wire and said throttle link.

4. The throttle control device as claimed in claim 1, wherein said traction movable element (33) is pulled by said traction wire (24) through said actuator (19) and said traction clutch (25) and transmits a torque to said rear flange (16b) of said throttle movable element during a traction control mode to reduce the opening of said throttle valve to a predetermined value through said throttle wire and said throttle link.

5. The throttle control device as claimed in any of claims 1 to 4, wherein said acceleration return spring (4), said acceleration movable element return spring (8), said throttle movable element return spring (15), said constant speed running return spring (20) and said traction return spring (26) normally bias said throttle valve towards a fully closed state.

6. The throttle control device as claimed in any of claims 1 to 4, wherein a spring constant of said intermediate spring (29) is not less than 1.5 times a spring constant of said throttle movable element return spring (15).

7. The throttle control device as claimed in claim 5, wherein a spring constant of said intermediate spring (29) is not less than 1.5 times a spring constant of said throttle movable element return spring.

* * * * *